United States Patent [19]
Garner, Jr.

[11] Patent Number: 6,161,851
[45] Date of Patent: Dec. 19, 2000

[54] LEAF MOVER SYSTEM

[76] Inventor: Francis C. Garner, Jr., 6315 Brickfront Pl., La Plata, Minn. 20646

[21] Appl. No.: 09/273,743

[22] Filed: Mar. 22, 1999

[51] Int. Cl.⁷ ....................................................... B62B 1/00
[52] U.S. Cl. ................................. 280/47.29; 280/47.18; 280/47.27
[58] Field of Search ............................. 280/47.17, 47.18, 280/47.27, 47.29

[56] References Cited

U.S. PATENT DOCUMENTS

| | | | |
|---|---|---|---|
| 609,129 | 8/1898 | Twist | 280/47.24 |
| 1,006,985 | 10/1911 | Smith | 280/47.18 |
| 2,320,387 | 6/1943 | Schroeder | 280/47.18 |
| 2,382,989 | 8/1945 | Gilbert | 280/87 |
| 4,048,735 | 9/1977 | Brunty | 280/47.24 |
| 4,503,661 | 3/1985 | Potter | 280/47.26 |
| 5,593,271 | 1/1997 | Hall | 280/47.21 |
| 5,630,601 | 5/1997 | Vom Braucke et al. | 280/40 |

*Primary Examiner*—J. J. Swann
*Assistant Examiner*—James S. McClellan

[57] ABSTRACT

A leaf mover system comprising a bed in a generally rectilinear configuration having a base plate with parallel side edges and a parallel front edge and parallel rear edge with respect thereto. The bed also has an upstanding forward end plate extending upwardly from the front edge of the base plate and upstanding parallel side walls extending upwardly from the side edges of the base plate. The rear end forms an opening. Journal bearings with parallel apertures extend downwardly from the base plate beneath the rear edge. A frame structure includes a rectangular support positioned over the majority of the lower surface of the base plate. The support has cylindrical apertures in axial alignment with the bearings beneath the base plate and pins extending therethrough. A handle is formed of a primary rod which has a rearward end pivotally coupled by a pin to the forward edge of the rectangular frame and a rearward end with a grasping part.

4 Claims, 3 Drawing Sheets

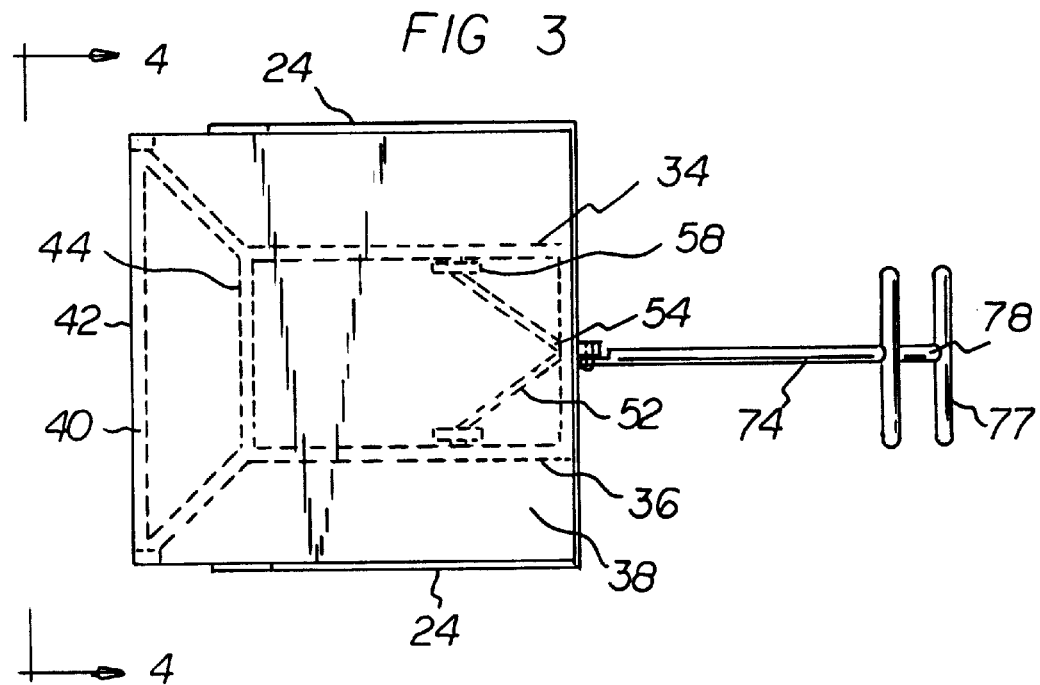
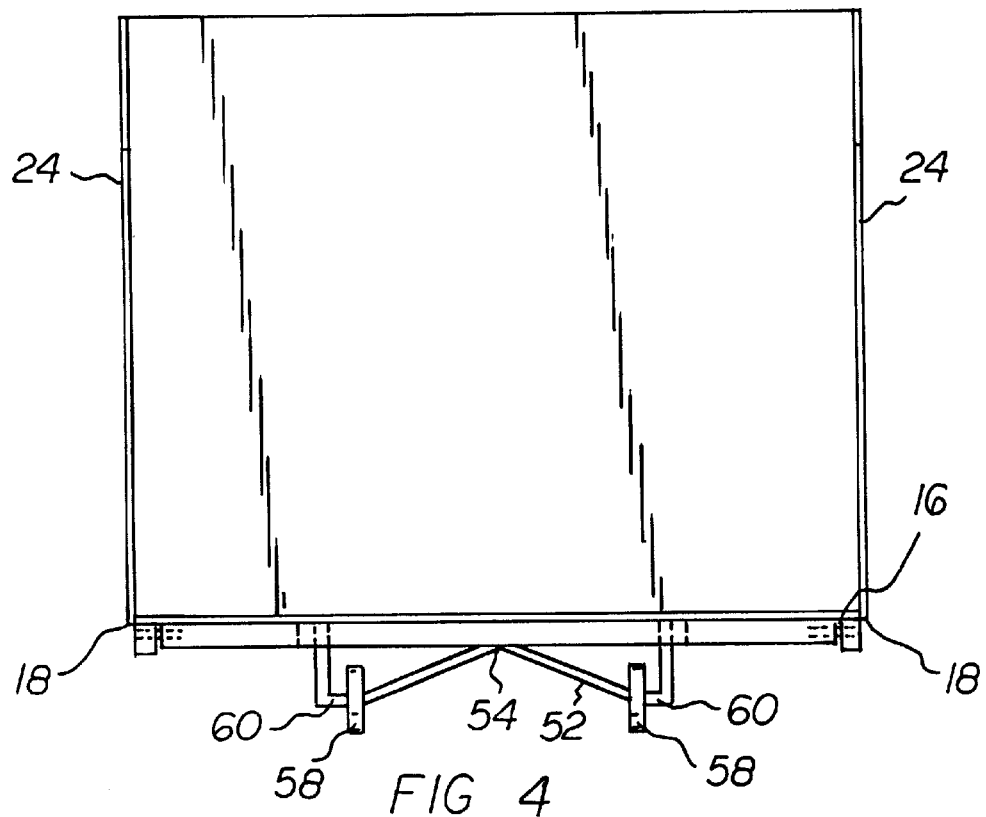

LEAF MOVER SYSTEM

BACKGROUND OF THE INVENTION

1. Field of the Invention

The present invention relates to a leaf mover system and more particularly pertains to conveniently receiving, transporting and dumping leaves.

2. Description of the Prior Art

The use of transportation systems of known designs and configurations is known in the prior art. More specifically, transportation systems of known designs and configurations heretofore devised and utilized for the purpose of transporting and handling objects of known designs and configurations are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,958,846 to Greenberg discloses a leaf wagon. U.S. Pat. No. 4,350,356 to Crothers discloses a cart. U.S. Pat. No. 3,084,363 to Vetne discloses a lawn sweeper or the like. U.S. Pat. No. 2,992,011 to Becan discloses a refuse cart. U.S. Pat. No. Des. 322,704 to Cummings, III discloses a leaf cart. Lastly, PCT International Application Number WO 97/45361 to Blom, et al discloses an improved cart.

While these devices fulfill their respective, particular objectives and requirements, the aforementioned patents do not describe a leaf mover system that allows conveniently receiving, transporting and dumping leaves.

In this respect, the leaf mover system according to the present invention substantially departs from the conventional concepts and designs of the prior art, and in doing so provides an apparatus primarily developed for the purpose of conveniently receiving, transporting and dumping leaves.

Therefore, it can be appreciated that there exists a continuing need for a new and improved leaf mover system which can be used for conveniently receiving, transporting and dumping leaves. In this regard, the present invention substantially fulfills this need.

SUMMARY OF THE INVENTION

In view of the foregoing disadvantages inherent in the known types of transportation systems of known designs and configurations now present in the prior art, the present invention provides an improved leaf mover system. As such, the general purpose of the present invention, which will be described subsequently in greater detail, is to provide a new and improved leaf mover system and method which has all the advantages of the prior art and none of the disadvantages.

To attain this, the present invention essentially comprises a bed. The bed is formed in a generally rectilinear configuration. The bed has a base plate with parallel side edges and a parallel front edge and parallel rear edge with respect thereto. The bed also has an upstanding forward end plate extending upwardly from the front edge of the base plate. The bed also has upstanding parallel side walls extending upwardly from the side edges of the base plate. The rear end forms an opening. Downwardly extending journal bearings with parallel apertures extend downwardly from the base plate beneath the rear edge. A frame structure includes a rectangular primary support positioned over the majority of the lower surface of the base plate. The frame structure also has a trapezoidal extent. The trapezoidal extent has a long edge beneath the front edge of the base plate rearwardly of the bed. The trapezoidal extent also has a short edge coincident with the forward portion of the rectangular primary support. The trapezoidal extent has cylindrical apertures in axial alignment with the bearings beneath the base plate. Pins extend therethrough. In this manner tipping of the bed with respect to the frame is effected. A supplemental support is provided. The supplemental support is formed in a W-shaped configuration. The supplemental support has its central extent secured to the interior surface of the forward portion of the rectangular support. The supplemental support has its free ends secured to the interior edges of the side portions of the rectangular support at intermediate extents thereof. Rotatable wheels are provided at the intermediate bent portions. In this manner rolling motion of the frame and bed is effected for transportation purposes. A handle is formed of a primary rod. The primary rod has a rearward end pivotally coupled by a pin to the forward edge of the rectangular frame. The primary rod has a rearward end with a T-shaped grasping part. A supplemental short handle extends upwardly at an angle from the primary rod. The supplemental short handle is provided with a T-shaped secondary gripping part at its forward end.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved leaf mover system which has all of the advantages of the prior art transportation systems of known designs and configurations and none of the disadvantages.

It is another object of the present invention to provide a new and improved leaf mover system which may be easily and efficiently manufactured and marketed.

It is a further object of the present invention to provide a new and improved leaf mover system which is of durable and reliable constructions.

An even further object of the present invention is to provide a new and improved leaf mover system which is susceptible of a low cost of manufacture with regard to both materials and labor, and which accordingly is then susceptible of low prices of sale to the consuming public, thereby making such leaf mover system economically available to the buying public.

Even still another object of the present invention is to provide a leaf mover system for conveniently receiving, transporting and dumping leaves.

Lastly, it is an object of the present invention to provide a new and improved leaf mover system comprising a bed in a generally rectilinear configuration having a base plate with parallel side edges and a parallel front edge and parallel rear edge with respect thereto, the bed also having an upstanding forward end plate extending upwardly from the front edge of the base plate and upstanding parallel side walls extending upwardly from the side edges of the base plate and with the rear end forming an opening and with downwardly extending journal bearings with parallel apertures extending downwardly from the base plate beneath the rear edge, a frame structure including a rectangular support positioned over the majority of the lower surface of the base plate, the support having cylindrical apertures in axial alignment with the bearings beneath the base plate and with pins extending therethrough, and a handle formed of a primary rod having a rearward end pivotally coupled by a pin to the forward edge of the rectangular frame and having a rearward end with a grasping part.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top elevational view of the device shown in FIGS. 1 and 2.

FIG. 4 is a rear elevational view of the device shown in the prior three Figures.

The same reference numerals refer to the same parts throughout the various Figures.

DESCRIPTION OF THE PREFERRED EMBODIMENT

Figure 1:
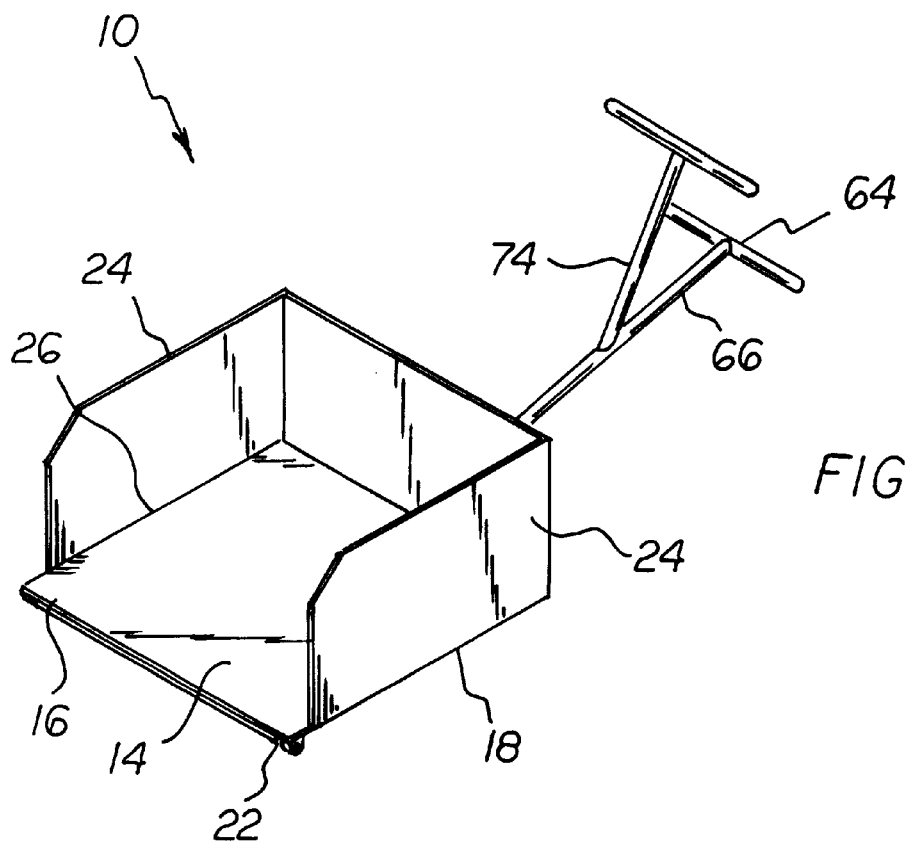
FIG. 1 is a perspective illustration of the new and improved leaf mover system constructed in accordance with the principles of the present invention.
Figure 2:
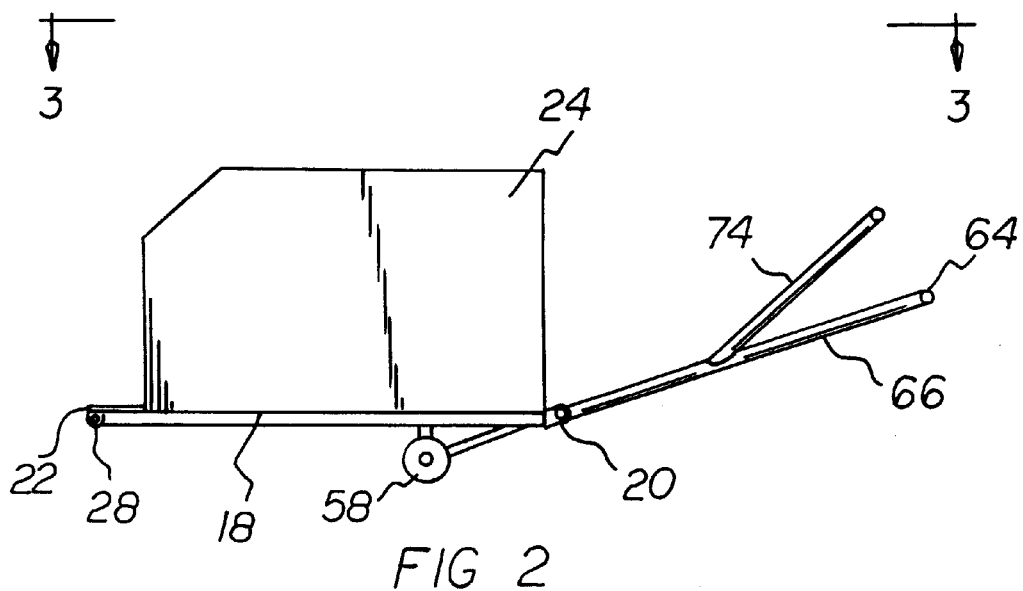
FIG. 2 is a side elevational view of the device shown in FIG. 1.
Figure 5:
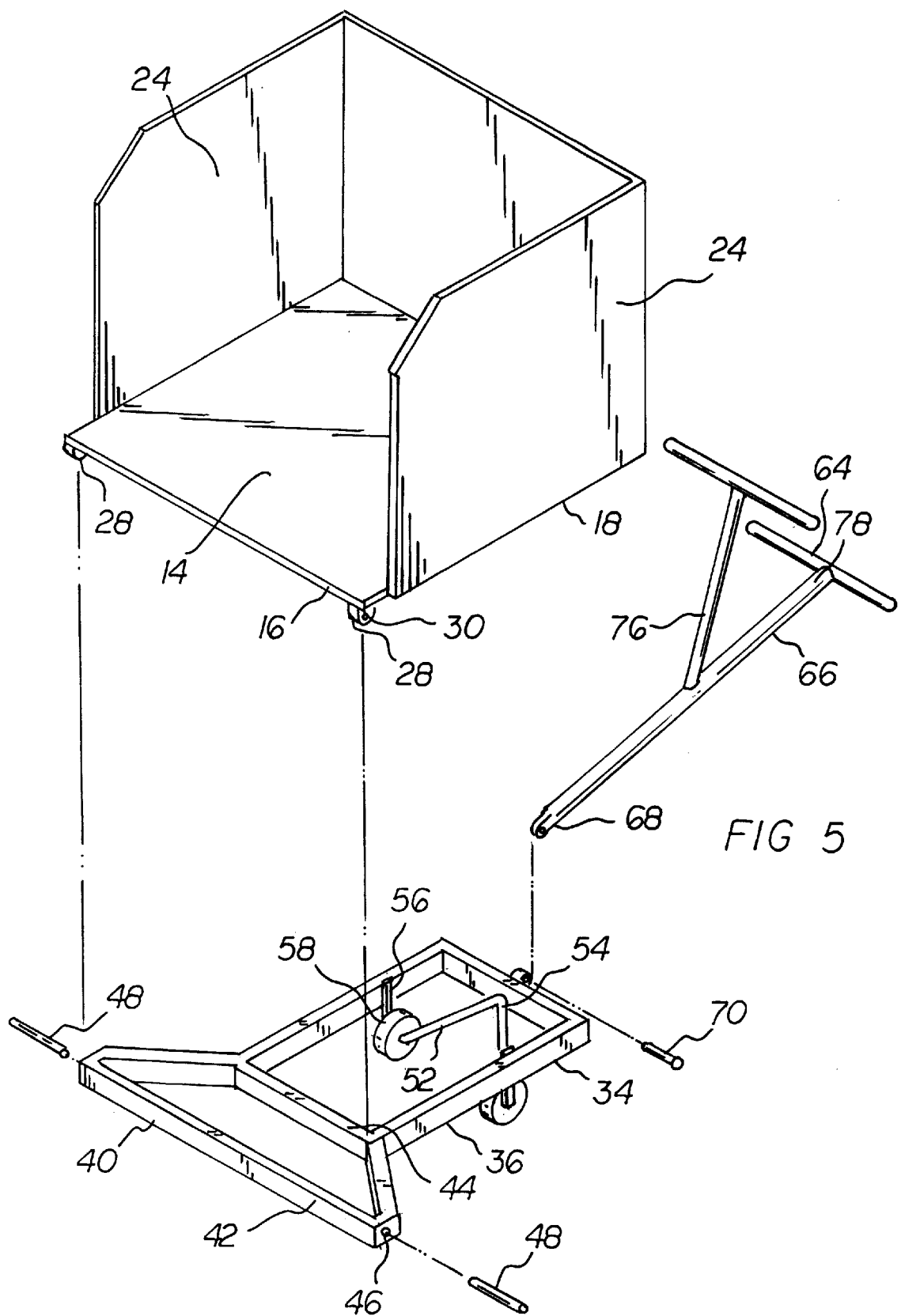
FIG. 5 is an exploded perspective view similar to FIG. 1.

With reference now to the drawings, and in particular to FIG. 1 thereof, the preferred embodiment of the new and improved leaf mover system embodying the principles and concepts of the present invention and generally designated by the reference numeral 10, will be described.

The present invention, the leaf mover system 10, is comprised of a plurality of components. Such components in their broadest context include a bed, a frame structure, and a handle. Such components are individually configured and correlated with respect to each other so as to attain the desired objective.

The bed 14 is formed in a generally rectilinear configuration. The bed has a base plate 16 with parallel side edges 18 and a parallel front edge and parallel rear edge 20 with respect thereto. The bed also has an upstanding forward end plate 22 extending upwardly from the front edge of the base plate. The bed also has upstanding parallel side walls extending upwardly from the side edges 24 of the base plate. The rear end forms an opening 26. Journal bearings 28 with parallel apertures 30 extend downwardly from the base plate beneath the rear edge.

A frame structure 34 includes a rectangular primary support 36 positioned over the majority of the lower surface 38 of the base plate. The frame structure also has a trapezoidal extent 40. The trapezoidal extent has a long edge 42 beneath the front edge of the base plate rearwardly of the bed. The trapezoidal extent also has a short edge 44 coincident with the forward portion of the rectangular primary support. The trapezoidal extent has cylindrical apertures 46 in axial alignment with the bearings beneath the base plate. Pins 48 extend therethrough. In this manner tipping of the bed with respect to the frame is effected.

A supplemental support 52 is provided. The supplemental support is formed in a W-shaped configuration. The supplemental support has its central extent 54 secured to the interior surface of the forward portion of the rectangular support. The supplemental support has its free ends 56 secured to the interior edges of the side portions of the rectangular support at intermediate extents thereof. Rotatable wheels 58 are provided at the intermediate bent portions 60. In this manner rolling motion of the frame and bed is effected for transportation purposes.

A handle 64 is formed of a primary rod 66. The primary rod has a rearward end 68 pivotally coupled by a pin 70 to the forward edge of the rectangular frame. The primary rod has a forward end 78 with a T-shaped grasping part 72. A supplemental short handle 74 extends upwardly at an angle from the primary rod. The supplemental short handle is provided with a T-shaped secondary gripping part 76 at its forward end.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A leaf mover system for the convenient receipt, transportation, and dumping of leaves, comprising, in combination:

a bed in a generally rectilinear configuration having a base plate with parallel side edges and a parallel front edge and parallel rear edge with respect thereto, the bed also having an upstanding forward end plate extending upwardly from the front edge of the base plate and upstanding parallel side walls extending upwardly from the side edges of the base plate and with the rear end forming an opening and with downwardly extending journal bearings with parallel apertures extending downwardly from the base plate beneath the rear edge;

a frame structure including a rectangular primary support positioned over the majority of the lower surface of the base plate and a trapezoidal extent having a long edge beneath the rear edge of the base plate rearwardly of the bed and a short edge coincident with the rearward portion of the rectangular primary support, the trapezoidal support having cylindrical apertures in axial alignment with the bearings beneath the base plate and with pins extending therethrough to effect the tipping of the bed with respect to the frame;

a supplemental support in a W-shaped configuration having a central extent secured to the interior surface of the forward portion of the rectangular support and having free ends secured to the interior edges of the side portions of the rectangular support at intermediate extents thereof and with rotatable wheels at the intermediate bent portions to effect the rolling motion of the frame and bed for transportation purposes; and a handle formed of a primary rod having a rearward end pivotally coupled by a pin to the forward edge of the rectangular frame and having a forward end with a T-shaped grasping part with a supplemental short handle extending upwardly at an angle from the primary rod with a T-shaped secondary gripping part at its forward end.

2. A leaf mover system comprising, in combination;

a bed in a generally rectilinear configuration having a base plate with parallel side edges and a parallel front edge and parallel rear edge with respect thereto, the bed also having an upstanding forward end plate extending upwardly from the front edge of the base plate and upstanding parallel side walls extending upwardly from the side edges of the base plate and with the rear end forming an opening and with downwardly extending journal bearings with parallel apertures extending downwardly from the base plate beneath the rear edge;

a frame structure including a rectangular support positioned over the majority of the lower surface of the base plate, the support having cylindrical apertures in axial alignment with the bearings beneath the base plate and with pins extending therethrough; and a handle formed of a primary rod having a rearward end pivotally coupled by a pin to the forward edge of the rectangular frame and having a forward end with a grasping part.

3. The system as set forth in claim 2 and further including a supplemental support in a W-shaped configuration having a central extent secured to the interior surface of the forward portion of the rectangular support and having free ends secured to the interior edges of the side portions of the rectangular support at intermediate extents thereof and with rotatable wheels at the intermediate bent portions to effect the rolling motion of the frame and bed for transportation purposes.

4. The system as set forth in claim 2 and further including a supplemental short handle extending upwardly at an angle from the primary rod with a T-shaped secondary gripping part at its forward end.

* * * * *